Patented July 26, 1949

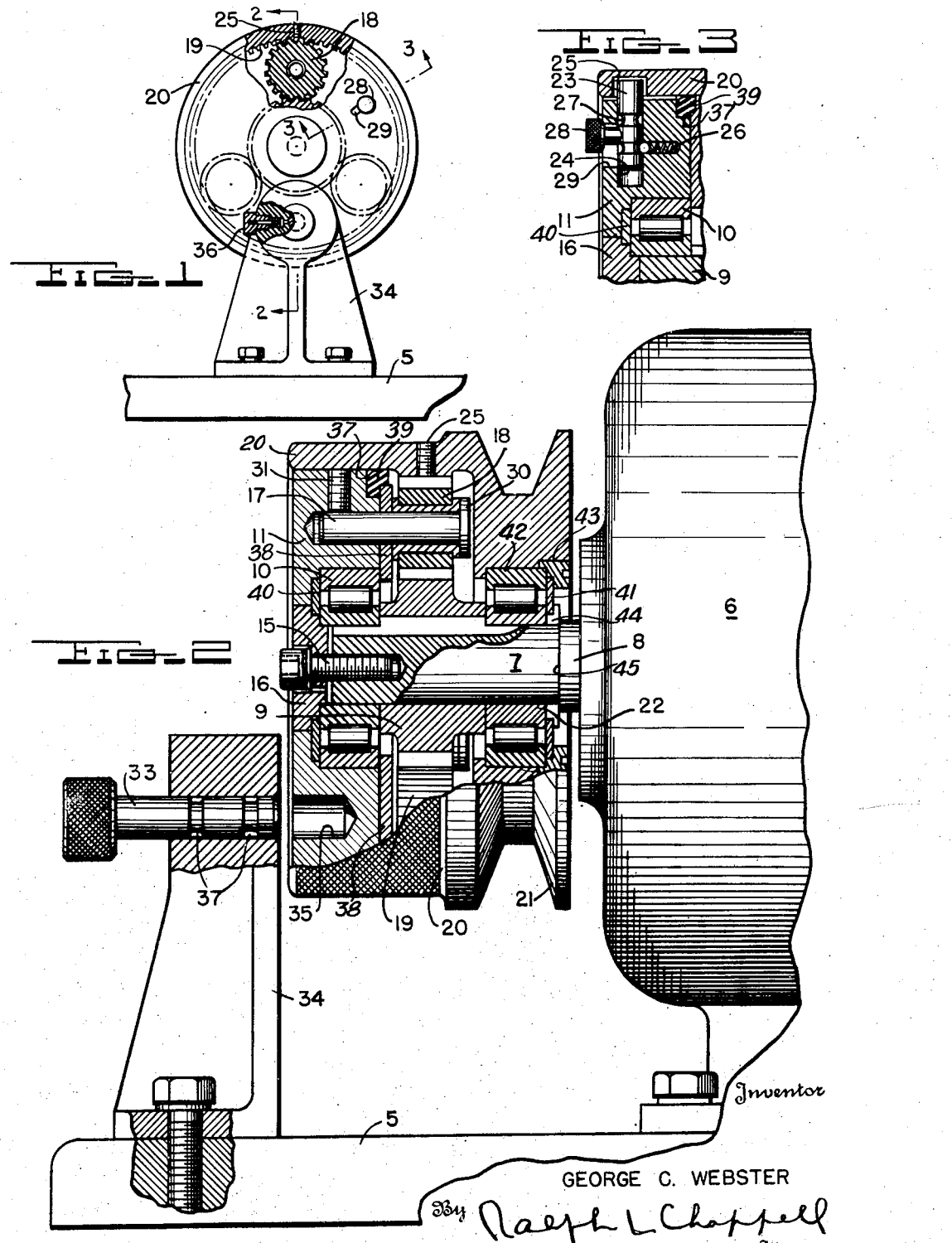

2,477,024

UNITED STATES PATENT OFFICE 2,477,024

ADJUSTABLE SPEED GEARING MECHANISM

George C. Webster, United States Navy

Application August 18, 1945, Serial No. 611,431

1 Claim. (Cl. 74—789)

(Granted under the act of March 3, 1883, as amended April 30, 1928; 370 O. G. 757)

This invention relates to adjustable speed gearing mechanisms.

In some types of power-driven apparatus it is desirable to provide a gearing mechanism whereby the speed of operation of the apparatus may be readily changed. While changeable speed mechanisms have been available heretofore, for the most part they are bulky and excessively complicated.

An object of the present invention is to provide a new and improved adjustable speed gearing mechanism, and more particularly a compact adjustable speed gearing mechanism whereby one of two speed ratios may be readily selected.

In accordance with one embodiment of this invention an adjustable speed gearing mechanism may be provided comprising a driven shaft to which is keyed a sun gear which meshes with a planet gear supported on a stub shaft mounted transversely in and extending from one side of a disc which is rotatably mounted coaxially of the driven shaft. The planet gear also meshes with an internal ring gear coaxially mounted with respect to the drive shaft and having a pulley associated therewith. Means are provided for preventing rotation of the planet gear supporting disc, thus causing the ring gear to be driven through the gear train comprising the planet gear, the sun gear and the ring gear. Alternate means are provided for locking the ring gear to the planet gear supporting disc, thus causing the ring gear to rotate at the same speed as the driven shaft.

Other objects and advantages of the present invention will be apparent from the following detailed description taken in conjunction with the drawings, wherein:

Fig. 1 is an end view, partially in section, of an adjustable speed gearing mechanism constructed in accordance with one embodiment of this invention;

Fig. 2 is an enlarged, sectional view, partially in elevation, taken substantially along the line 2—2 of Fig. 1; and Fig. 3 is a detail, sectional view taken substantially along the line 3—3 by Fig. 2, showing the mechanism whereby the planet gear supporting disc is locked to the internal ring gear.

Referring now to the drawings, it will be seen that a base 5 is provided, on the right end of which, as viewed in Fig. 2, is mounted a motor 6, from the left side of which extends a driving shaft 7, a suitable bearing 8 being provided in the left side of the motor housing to rotatably support the drive shaft 7. Intermediate the left end of the drive shaft 7 and the bearing 8 is mounted a sun gear 9 which is keyed to the drive shaft 7 and rotatable therewith. An annular bearing assembly 10 is mounted adjacent the left side of the sun gear 9 on the shaft 7 and serves as a support for a carrier disc 11, which is thus freely rotatable on an axis coaxial with the axis of rotation of the shaft 7. The bearing assembly 10 is retained in position by a threaded member 15 which is threaded into the left end of the shaft 7 and provided with a retaining collar 16 which bears against the left side of the inner portion of the bearing assembly, the carrier 11 thus being rotatable with respect to the shaft 7 and collar 16.

Three short stub shafts 17 are mounted on the right face of the carrier 11 and extend at right angles therefrom, being equally radially spaced from the axis of rotation of the carrier. These shafts serve as supports for a corresponding number of planet gears 18, which are rotatably mounted on the right ends of the shafts 17, being retained thereon by flanges 30 integrally formed with the right ends of each of the stub shafts 17. The stub shafts 17 are held in position on the carrier 11 by associated set screws 31. The inner portions of these planet gears mesh with the sun gear 9 while their outer portions mesh with an internal ring gear 19 which is fixed to or integrally formed with the inner side of a large cylindrical housing 20. A driven member in the form of a pulley 21 having a V-groove driving surface suitable to receive a conventional V belt is fixed to or is integrally formed with the right portion of the housing 20. The carrier disk 11 is rabbeted at 37 around its peripheral margin on the side nearest the sun gears and is provided with a holding ring 38 fitted between the planet gears and the carrier and extending radially outwardly into overlapping relation with the rabbeted portion of the carrier for holding a grease-retainer ring 39 seated in the rabbeted portion and in contact with the housing 20 and holding ring 38. To complete a seal for lubricant contained within the housing, a grease-retainer ring 40 is seated between and in contact with the carrier disk 11, collar 16 and bearing assembly 10, while a third grease-retainer ring 41 is seated between and in contact with the pulley bearing assembly 42, the ring-nut 43 and a holding ring 44 abutting a shoulder 45 on the shaft. It will be understood, of course, that any type of pulley may be employed or that a gear could be used where desired. The pulley 21 and housing 20 are rotatably supported coaxially of the drive shaft 7 by a second annular bearing assembly 22 which is mounted on the periphery of the shaft 7 intermediate the sun gear 9 and the bearing 8.

In the operation of this device when it is desired to obtain a direct drive, that is a one to one ratio drive, from the driving shaft 7 to the driven pulley 21, a pin 23 slidably mounted in a radially extending slot 24 formed in the outer portion of the carrier 11, as shown in Figs. 1 and 3, is moved outwardly to cause its outer end to enter a notch 25 suitably formed in the inner side of the left portion of the housing 20, thus locking the carrier 11 to the housing 20, and preventing relative rotative movement therebetween. This prevents rotation of the planet gears 18 with respect to their associated stub shafts 17 but since the carrier 11 is free to rotate with respect to the drive shaft 7, a direct drive is provided and the pulley 21 will rotate at the same speed as the shaft 7. In order to prevent the pin 23 from accidentally moving into or out of the notch 25, a spring detent 26 is mounted in the carrier 11 at right angles to the slot 24 and is engageable with notches 27 suitably formed in the adjacent side of the pin 23. A handle 28 is fixed to and extends from the opposite side of the pin 23 through a slot 29 which extends parallel to and communicates with the pin slot 24; the handle 28 facilitates adjusting the position of the pin 23.

When it is desired to reduce the speed of rotation of the pulley 21 while maintaining the same drive shaft speed, the pin 23 is withdrawn into the carrier 11 to permit the carrier 11 to rotate with respect to the housing 20 and the planet gears 18 to rotate freely with respect to the supporting shafts 17. A plunger 33 mounted on an upright stationary bracket 34, which is located adjacent the left side of the carrier 11 and which is rigidly mounted on the base 5 of the apparatus, is moved to the right to cause its right end to enter an aperture 35 formed in the left side of the carrier 11. A suitable detent mechanism 36 may be mounted on the bracket 34 adjacent to the plunger 33 and engageable with suitable notches 37 formed therein to prevent the plunger 33 from accidentally moving out of the aperture 35 or moving into the aperture 35 as the case may be. When the carrier 11 is held stationary, while the planet gears 18 are permitted to rotate on their associated supporting shafts 17, it will be apparent that the sun gear keyed to the shaft 7 will drive the ring gear 19 through the planet gears 18 and that the speed of rotation of the ring gear 19 with respect to the shaft 7 will depend upon the gear ratios existing between the gears 9, 18 and 19. In the case shown a speed reduction of approximately 50% is effected. However, it will be understood that by a proper selection of gears a wide range of speed ratios may be obtained.

When it is desired to disconnect the pulley 21 from the drive shaft 7, both the pin 23 and the plunger 33 are removed respectively from the notches in the housing 20 and from the aperture 35, thus permitting the planet gears to travel freely about the interior of the ring gear 19, and the exterior of the sun gear 9 as they are rotated by the gear 8.

By applying the driving power to the pulley 21 or other similar device, rather than to the drive shaft 7, it will be apparent that instead of providing as an alternate speed ratio a reduced speed ratio, the alternate speed, that is the speed ratio obtained when the plunger 33 engages the sides of the aperture 35 will be higher than the speed of rotation of the pulley 21 and the shaft 7 will then be driven at a greater speed.

While but one embodiment of this invention has been shown and described it will be understood that many changes and modifications may be made therein without departing from the spirit or scope of the present invention.

The invention shown and described herein may be manufactured or used by or for the Government of the United States of America for governmental purposes without the payment of any royalties thereon or therefor.

What is claimed is:

A planetary-gear transmission device adapted to be slid onto a driving shaft of a motor, said transmission device comprising a sun gear slidable onto the shaft and having a key way for fixing the gear against rotation relative to the shaft, a planetary-gear carrier-disk rotatably mounted on the shaft through a roller bearing assembly seated on the shaft and slidable along the shaft to facilitate assembly, a driven pulley rotatably mounted on the shaft and bearing on the shaft through a second roller bearing assembly seated on the shaft in the plane of the pulley symmetrically of the pulley and slidable along the shaft to facilitate assembly, planetary gears carried by said carrier in mesh with said sun gear, stub shafts mounting the planetary gears on the carrier having one end fixed in the carrier and the other end provided with a retaining flange, said carrier disk being rabbeted around its peripheral margin on the side nearest said sun gears, a holding ring fitted between the planet gears and the carrier and extending radially outwardly into overlapping relation with the rabbeted portion of the carrier disk, and movable with the carrier disk by virtue of the stub shafts passing therethrough into fixed connection with the carrier, a cylindrical housing carried by the pulley and extending axially therefrom over the planetary gears and carrier disk, a grease-retainer ring seated in the rabbeted portion of the carrier and in contact with the said holding ring and housing, a retaining collar secured to the end of the shaft for retaining the carrier disk and its roller-bearing assembly on the shaft, a grease-retainer ring situated between and in contact with said carrier disk, collar and bearing assembly, a ring nut clamping the bearing assembly for the pulley to the pulley from the side of the pulley farthest from the planet gears, a holding ring held against the pulley bearing-assembly at the side farthest from the planet gears and abutting a shoulder on the shaft, a grease-retainer ring positioned between and in contact with the pulley bearing assembly, the ring nut and the last mentioned holding ring, a pin slidably mounted in the carrier disk for radial movement beyond the periphery of the disk into engagement with the housing to lock the carrier and housing together at will, a stationary bracket fixed relative to said motor, and a plunger element slidably mounted in said bracket for movement into engagement with the carrier disk to lock the same relative to said bracket.

GEORGE C. WEBSTER.

(References on following page)

REFERENCES CITED

The following references are of record in the file of this patent:

UNITED STATES PATENTS

| Number | Name | Date |
|---|---|---|
| 503,919 | Vogel | Aug. 22, 1893 |
| 804,438 | Simonds | Nov. 14, 1905 |
| 846,182 | Broughton | Mar. 5, 1907 |
| 1,060,999 | Meyers | May 6, 1913 |
| 1,083,863 | Shortman | Jan. 6, 1914 |
| 1,161,463 | Ehlin | Nov. 23, 1915 |
| 1,213,243 | Page | Jan. 23, 1917 |
| 2,236,631 | Thomas | Apr. 1, 1941 |
| 2,296,519 | Griswold | Sept. 22, 1942 |
| 2,296,573 | Richards | Sept. 22, 1942 |
| 2,321,960 | Weaver | June 15, 1943 |
| 2,407,975 | Christian | Sept. 24, 1946 |

FOREIGN PATENTS

| Number | Country | Date |
|---|---|---|
| 21,615 | Great Britain | Oct. 13, 1908 |
| 115,175 | Great Britain | May 2, 1918 |